Jan. 17, 1928.
R. S. SANFORD
1,656,294
BRAKE OPERATING MECHANISM
Filed Feb. 15, 1926
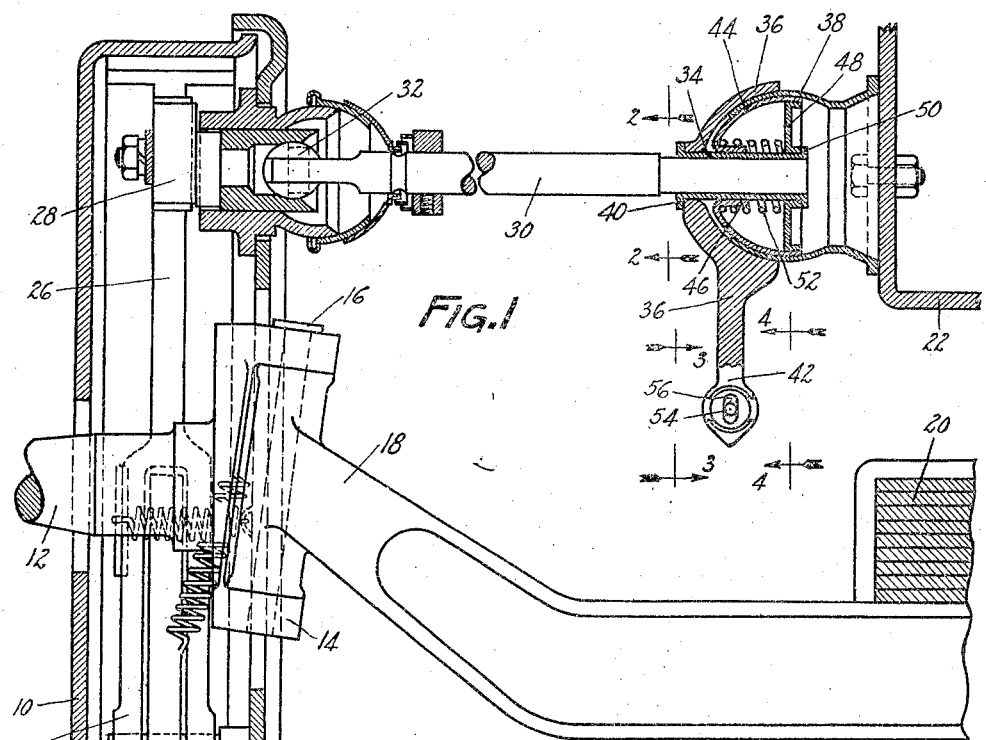
FIG.1
FIG.2
FIG.3
FIG.4
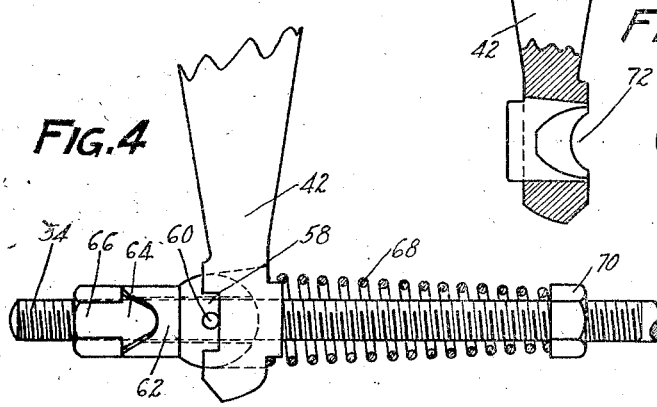
INVENTOR
ROY S. SANFORD
BY
ATTORNEY Patented Jan. 17, 1928.

1,656,294

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed February 15, 1926. Serial No. 88,168.

This invention relates to operating mechanism for vehicle brakes and the like, and is illustrated as embodied in novel operating mechanism for a front wheel automobile brake.

One feature of the invention relates to supporting the chassis end of the brake-applying shaft by a universal support including a novel cap forming part of the support and having a brake-operating arm, preferably integral therewith. Important minor features of novelty relate to housing in the support a spring yieldingly holding the cap against the support.

Another feature contemplates connecting the brake rod to the above-mentioned or an equivalent brake-applying arm by novel means permitting easy and very rapid adjustment of the brake, and preferably permitting the rod to be at a considerable angle to the arm.

The above and other objects and features of the invention, including various novel combinations of parts and desirable particular constructions, will be apparent from the following description of two illustrative embodiments shown in the accompanying drawing, in which:

Fig. 1 is a vertical transverse section through one front brake and through associated parts;

Fig. 2 is a vertical section through the brake-applying shaft, on the line 2—2 of Fig. 1;

Fig. 3 is a side elevation, partly broken away in vertical section, of the lower end of the brake-applying arm, looking toward the right in the direction of the arrows 3—3 of Fig. 1, and showing the adjusting nut opposite the end of the arm; and Fig. 4 is a view of a modification of the arm, looking in the direction of the arrows 4—4 of Fig. 1, and showing the connection between the arm and the brake rod.

The illustrated brake includes a drum 10 rotating with a wheel (not shown), which wheel is mounted on the spindle 12 of a knuckle 14. Knuckle 14 is swivelled, as by a king pin 16, to an axle 18 which, with a rear axle (not shown), yieldingly supports through springs 20 the usual chassis frame 22. The open side of drum 10 is closed by a backing plate 24 carried by knuckle 14, and on which are anchored shoes 26 applied by means such as a double cam 28. The particular brake illustrated is more fully described in Patent No. 1,567,716, granted Bendix Brake Company on December 29, 1925, on an application filed by Adiel Y. Dodge. Cam 28 is rocked to apply the brake by a shaft 30, through a suitable universal joint 32 above king pin 16.

At its chassis end, shaft 30 is squared, or otherwise feathered to a sleeve 34 which slidably supports the end of the shaft. Sleeve 34 is embraced by a squared opening in a novel cap 36, in the form of a semi-spherical shell slidably engaging the outer semi-spherical face of a support 38 secured to frame 22, and has a flange 40 engaging the outer face of the cap. Cap 36 is extended to form a brake-operating arm 42. Within support 38 is a semi-spherical shell 44, having a squared flange 46 slidably holding sleeve 34. A stop 48 on the end of the sleeve is held by a flange 50 spun over on the end of the sleeve. A spring 52 confined between shell 44 and stop 48 serves to clamp cap 36 yieldingly against the outside of support 38.

The lower end of arm 42 may be connected to a brake rod 54 having a threaded end, either as in Fig. 3 or as in Fig. 4.

In Fig. 4, the rod 54 passes through an opening 56 (Fig. 1) in the bottom of a semi-spherical socket in the end of the arm. This socket has squared notches 58 in its edges to receive pins or other projections 60 on a sleeve 62 having a spherical base received in the socket. Projections 60 and the notches 58 prevent the sleeve from turning on the rod 54. Projections 60 are substantially on the horizontal diameter of the base of the sleeve, so that the sleeve does not prevent rod 54 from being at a considerable angle to arm 42. Sleeve 62 has notches receiving projections 64 on a nut 66 threaded on rod 54, and against which sleeve 62 and arm 42 are held by a spring 68 confined by an adjustable stop nut 70.

Where rod 54 does not have to be at any considerable angle to arm 42, i. e. where it may be nearly at a right angle, the construction of Fig. 3 may be used. In this arrangement, the socket in the end of arm 42 has rounded notches 72 in its edges, which notches serve both the functions of notches 58 in Fig. 4, and also of the notches receiving projections 64. Nut 74, corresponding to nut 66 and threaded on rod 54, has an integral spherical base 76, corresponding to sleeve 62 with its spherical base, and has pins or other projections 78 to be received in notches 72, and which correspond to the two sets of projections 60 and 64.

In either Fig. 3 or Fig. 4, the notches 72, or the rounded notches receiving projections 64, are, according to one feature of the invention, substantially equal in depth to the movement of the end of arm 42 in applying and releasing the brake. By this arrangement, with the brake pedal in released position, nut 66 or nut 74 is tightened up until projections 64 or 78 can no longer be turned out of their notches. On the last turn of the nut, as the projections rode out of their notches, i. e. as arm 42 was moved a distance equal to the depth of the notches, cam 28 was turned to brake-applied position. Therefore, with the projection again in the notches, depression of the brake pedal to move arm 42 a distance equal to the depth of the notches will also just turn cam 28 to this brake-applied position,—i. e. the brake-operating mechanism is fully adjusted, with no undesired lost motion at the pedal.

While illustrative embodiments have been described in detail, it is not my intention to limit the scope of the invention to those particular embodiments, or otherwise than by the terms of the appended claims.

I claim:

1. Operating means for a brake forming part of a chassis including a yieldingly-supported frame, said means comprising, in combination, a brake-applying shaft, an outwardly-spherical support carried by the frame, a spherical cap fitting over the support and slidably supporting the shaft and arranged to rock the shaft and formed with a brake-applying arm, and a spring housed within the support and yieldingly holding the cap against the support.

2. Operating means for a brake forming part of a chassis including a yieldingly-supported frame, said means comprising, in combination, a brake-applying shaft, an outwardly-spherical support carried by the frame, a spherical cap fitting over the support and slidably supporting the shaft and arranged to rock the shaft and formed with a brake-applying arm, a spherical shell member within the support, and a single spring urging the cap against the outside of the support and the shell against the inside of the support.

3. Operating means for a brake forming part of a chassis including a yieldingly-supported frame, said means comprising, in combination, a brake-applying shaft, an outwardly-spherical support carried by the frame, a cap fitting over the end of the support and having an operating arm, a shell engaging the inside of the support, a sleeve slidably supporting and feathered to the end of the shaft and feathered to and engaging the outside of said cap and having a stop inside said shell, and a spring confined between the shell and stop.

4. Brake-operating mechanism including, in combination, a brake-applying arm having at its end an adjusting part, and a brake rod passing through the end of the arm and having threaded thereon a co-operating adjusting part, one of said parts having projections and the other having notches for the projections of a depth approximately equal to the movement of the end of the arm when the brake is applied.

5. Brake-operating mechanism including, in combination, a brake-applying arm having at its end a semispherical socket with an opening in its bottom and with squared notches in its edges, a brake rod having a threaded end passing through the opening, a sleeve on the rod having a semi-spherical base seated in said socket and projections in the squared notches and formed in its edges with rounded notches, and a nut threaded on the brake rod having projections in the rounded notches.

In testimony whereof, I have hereunto signed my name.

ROY S. SANFORD.